(12) United States Patent
Reznik et al.

(10) Patent No.: US 9,829,254 B2
(45) Date of Patent: Nov. 28, 2017

(54) INSTALLATION FOR STORING THERMAL ENERGY

(71) Applicant: Siemens Aktiengesellschaft, Munich (DE)

(72) Inventors: Daniel Reznik, Berlin (DE); Henrik Stiesdal, Odense C (DK)

(73) Assignee: SIEMENS AKTIENGESELLSCHAFT, Munich (DE)

(*) Notice: Subject to any disclaimer, the term of this patent is extended or adjusted under 35 U.S.C. 154(b) by 497 days.

(21) Appl. No.: 14/345,238

(22) PCT Filed: Sep. 24, 2012

(86) PCT No.: PCT/EP2012/068758
§ 371 (c)(1),
(2) Date: Mar. 15, 2014

(87) PCT Pub. No.: WO2013/045388
PCT Pub. Date: Apr. 4, 2013

(65) Prior Publication Data
US 2014/0224447 A1     Aug. 14, 2014

(30) Foreign Application Priority Data
Sep. 29, 2011 (EP) .................................. 11183273

(51) Int. Cl.
    *F28D 20/00*     (2006.01)
    *F03D 9/18*     (2016.01)
    *F03D 9/22*     (2016.01)

(52) U.S. Cl.
CPC ........... *F28D 20/0056* (2013.01); *F03D 9/18* (2016.05); *F03D 9/22* (2016.05); *Y02E 10/72* (2013.01); *Y02E 60/142* (2013.01); *Y02P 80/158* (2015.11)

(58) Field of Classification Search
CPC ........ F28D 20/0056; F28D 15/02; F01K 3/12; F03D 9/00; F03D 9/10; F03D 9/18; F03D 9/19; Y02E 60/142
(Continued)

(56) References Cited

U.S. PATENT DOCUMENTS 5,384,489 A * 1/1995 Bellac ....................... F03D 9/10
    290/44
5,436,508 A     7/1995 Sorensen
(Continued)

FOREIGN PATENT DOCUMENTS

CH     EP 2241737 A1 * 10/2010 ............... F03D 9/10
CN     101883913 A     11/2010
(Continued)

*Primary Examiner* — Len Tran
*Assistant Examiner* — Hans Weiland
(74) *Attorney, Agent, or Firm* — Beusse Wolter Sanks & Maire

(57) ABSTRACT

An installation for storing thermal energy is provided. The storage is carried out by the compression and relaxation of a working gas, wherein pump and compressor can be driven by, for example, electric motors which temporarily absorb excess power generated in the power grid. The generated thermal energy is temporarily stored in a cold accumulator and a heat accumulator. According to the invention, a vapor circuit is provided to connect to the heat accumulator and the cold accumulator for discharging the installation, by which a turbine for generating electrical energy can be driven by a generator. Said circuit is implemented by means of another conduit system distinct from the circuit for charging the installation. Advantageously, thermal energy generated from overcapacities in the power grid can thus be reconverted with high yield into electrical energy via a vapor circuit.

18 Claims, 3 Drawing Sheets

(58) Field of Classification Search
USPC .......................................................... 165/10
See application file for complete search history.

(56) References Cited

U.S. PATENT DOCUMENTS

| | | |
|---|---|---|
| 2005/0072154 A1 | 4/2005 | Frutschi |
| 2008/0134681 A1* | 6/2008 | Nayef ....................... F03D 9/10 60/659 |
| 2009/0126381 A1 | 5/2009 | Diaz |
| 2010/0257862 A1 | 10/2010 | MacNaghten |
| 2011/0083443 A1 | 4/2011 | Jockenhoevel et al. |
| 2011/0100611 A1* | 5/2011 | Ohler ........................ F01K 3/12 165/104.28 |
| 2011/0286724 A1* | 11/2011 | Goodman ........... F28D 20/0056 392/346 |

FOREIGN PATENT DOCUMENTS

| | | |
|---|---|---|
| CN | 101970832 A | 2/2011 |
| CN | 102099551 A | 6/2011 |
| WO | 03/076769 A1 | 9/2003 |
| WO | 2007029680 A1 | 3/2007 |
| WO | 2010006942 A2 | 1/2010 |

* cited by examiner

INSTALLATION FOR STORING THERMAL ENERGY

CROSS REFERENCE TO RELATED APPLICATIONS

This application is the US National Stage of International Application No. PCT/EP2012/068758 filed Sep. 24, 2012, and claims the benefit thereof. The International Application claims the benefit of European Application No. EP11183273 filed Sep. 29, 2011. All of the applications are incorporated by reference herein in their entirety.

FIELD OF INVENTION

The invention relates to an installation for storing thermal energy, said installation having a charging circuit for a working gas, that is to say a working gas is used in the charging circuit. In the charging circuit, the following units are connected to one another in the stated sequence by a first line for the working gas: a first thermal fluid energy machine, a heat accumulator and a second thermal fluid energy machine. As viewed in the throughflow direction of the working gas from the first thermal fluid energy machine to the second thermal fluid energy machine, the first thermal fluid energy machine is positioned as work machine and the second fluid energy machine is positioned as prime mover.

BACKGROUND OF INVENTION

The expressions "prime mover" and "work machine" are used within the context of this application with the following meanings: a work machine absorbs mechanical work in order to perform its task. A thermal fluid energy machine that is used as a work machine is thus operated as a compressor. By contrast, a prime mover performs work, wherein a thermal fluid energy machine for performing work converts the thermal energy that is available in the working gas. In this case, the thermal fluid energy is thus operated as a motor.

The expression "thermal fluid energy machine" is an umbrella term for machines that can extract thermal energy from a working fluid, in the context of this application a working gas, or supply thermal energy to said working fluid. Thermal energy is to be understood to mean both heat energy and also cold energy. Thermal fluid energy machines (also referred to for hereinafter for short as fluid energy machines) may for example be designed as piston-type machines. It is preferably also possible for use to be made of hydrodynamic thermal fluid energy machines whose rotors permit a continuous flow of the working gas. Use is preferably made of axially acting turbines and compressors.

The principle specified above is described for example in US 2010/0257862 A1. In said document, piston-type machines are used to perform the described method. Moreover, it is known from U.S. Pat. No. 5,436,508 that, by the installations specified above for storing thermal energy, overcapacities in the case of the utilization of wind energy for producing electrical current can be temporarily stored in order to be drawn upon again if required.

SUMMARY OF INVENTION

It is an object of the invention to specify an installation for storing thermal energy of the type specified above (for example conversion of mechanical energy into thermal energy with subsequent storage or conversion of the stored thermal energy into mechanical energy) in which high efficiency can be achieved with simultaneously reasonable expenditure for the structural units that are used.

With the installation, specified above, for storing thermal energy, the object is achieved according to aspects of the invention in that the stated heat accumulator can also be connected, via a second line, into a discharging circuit for steam as working medium, wherein, in the discharging circuit, the following units are connected to one another in the stated sequence by the second line: a pump, the heat accumulator, and a third thermal fluid energy machine positioned as prime mover, which third thermal fluid energy machine may in particular be a steam turbine. The pump is used as a force thermal fluid energy machine, wherein it should be noted that said pump delivers liquid water. Said water is evaporated in the heat store and can in this way drive the steam turbine. The charging of the installation with thermal energy, and the discharging of the thermal energy from the installation, is possible in an advantageous manner in this way. The discharging circuit conducts steam and, in this case, does not differ from customary steam circuits of conventional power plants. However, the object is achieved by virtue of the fact that a steam circuit of said type is, by way of the thermal accumulator, combined with a charging circuit of the type specified above, and in this way the steam circuit can be used as a discharging circuit for the thermal accumulator. It is advantageously possible, through the use of steam as working medium in the discharging circuit, to achieve higher energy densities, whereby use may be made of relatively small and inexpensive components. In this way, high efficiency can be achieved, and the material outlay for the structural units that are used, and thus the procurement costs for said structural units, are reduced.

Normally, a steam circuit of the described type is closed. Then, a condenser is arranged in the closed circuit between the third fluid energy machine and the pump, which condenser extracts heat from, and thereby liquefies, the working medium after the latter passes through the steam turbine. In principle, however, it is also conceivable for the circuit to be of open configuration. The pump must then be fed with feed water from the environment, whereas the working medium is discharged into the environment again after passing through the third fluid energy machine.

In one refinement of the invention, it is provided that the heat accumulator is traversed by flow in opposite directions in the charging circuit and in the discharging circuit. This is achieved through suitable connection of the heat accumulator to the charging circuit and to the discharging circuit by virtue of said heat accumulator being connected in each case into the first line or into the second line. Opposite throughflow directions during the charging and discharging of the heat accumulator has the advantage that the hot-cold front moves in each case in opposite directions during charging and discharging. In this way, it is possible at any time to switch back and forth between the operating states of charging and discharging, without the need to wait until the heat accumulator is fully charged or discharged.

In another refinement of the invention, it is provided that the heat accumulator has a first duct system connected to the first line and has an independent second duct system connected to the second line. This has the advantage that the duct systems can each be configured optimally for the prevailing operating states. Here, it should be noted that the discharging circuit, in which steam, in particular water vapor, is used, is advantageously operated for example at a pressure of 100 bar. The charging circuit, which should advantageously be operated with commercially available hydrodynamic compressors, would in this case need to be configured for a pressure of merely 15 bar. In this way, the walls of the first duct system can be configured with a smaller wall thickness than the walls of the second duct system. It is preferable for the duct systems to be formed by pipes running parallel in a heat storage medium, for example concrete. An alternative to independent duct systems would be the incorporation of valves in which the single duct system provided through the heat accumulator can be switched alternately into the first line or into the second line. However, in the event of an operational switch from discharging to charging, drying of the duct system would have to be performed, resulting in time being lost. Said drying step can advantageously be omitted if independent duct systems are used for the charging circuit and the discharging circuit.

If two duct systems are provided, it is also possible for different materials to be selected for the pipes. Instead of different wall thicknesses, it is for example possible for a more stable material to be selected for the second duct system. Allowance may also be made for the fact that different corrosion conditions prevail in the duct systems.

Furthermore, if a first duct system and a second duct system are provided, it is advantageously possible for the charging and discharging of the heat accumulator to take place simultaneously. Said operating state may advantageously be utilized for example if charging operation is presently still possible owing to an excess of generated wind energy but, for example based on evaluation of a weather report, it can be predicted that wind energy will shortly no longer be available and, furthermore, the demand for electrical energy can no longer be covered. Since the discharging circuit requires a certain run-up time before electrical energy can be obtained, said discharging circuit is already started up even though the charging process can presently still be continued. Thereafter, when the expected energy deficit occurs, electrical energy can be immediately provided by discharging of the heat accumulator.

It is advantageous for the ratio of the volume of the first duct system to the volume of the second duct system to be approximately inversely proportional to the ratio of the increase of the specific enthalpy in the first duct system during charging operation to the increase of the specific enthalpy in the second duct system during discharging operation. In the context of this invention, "approximately" means that the inverse proportionality may exhibit a deviation of up to 25%, preferably of up to 10%, while still lying in the admissible proportionality range within the context of the invention.

In one particularly advantageous refinement of the invention, if two duct systems are used, it may be provided that the first duct system and the second duct system are formed by pipes running parallel, wherein each pipe belonging to the first duct system runs adjacent to at least one pipe of the second duct system. In other words, the pipes of the two duct systems are arranged in the heat exchanger such that, despite there being a higher number of pipes of the first duct system, each pipe of the first duct system always has a pipe of the second duct system situated in the vicinity thereof. In this way, it is advantageously ensured that, both during the charging and also during the discharging of the heat accumulator, homogenous heating thereof can be achieved via its available cross-sectional area perpendicular to the profile of the pipes. The heat capacity of the storage medium in the heat accumulator can be optimally utilized in this way.

It is furthermore advantageous for the third thermal fluid energy machine to be of at least two-stage construction with a high-pressure turbine and a low-pressure turbine. This operating principle for turbines is already well known for the recovery of mechanical (electrical) energy from steam. The steam can then be expanded in two stages. This makes it possible for a greater fraction of the energy content of the steam to be converted into mechanical energy. The efficiency of the installation as a whole is advantageously increased in this way.

Furthermore, the two-stage expansion of the steam makes it possible for a first closable bypass line to be connected in parallel with the high-pressure turbine in the second line. In this way, a further advantage of the installation according to the invention can be achieved by virtue of the fact that the heat stored in the heat accumulator can be better utilized. Specifically, the high-pressure turbine can be operated with satisfactory efficiency only for as long as the temperature in the heat accumulator is sufficient for superheating the water vapor and thus building up the pressure required for the operation of the high-pressure turbine. If the temperature in the heat accumulator has fallen to such an extent that said pressure can no longer be built up, then the temperature is still adequate for the operation of the low-pressure turbine. To improve efficiency in this operating state, it is then possible for the bypass line to be opened such that the high-pressure turbine is bypassed. The heat accumulator can thus be discharged further while maintaining satisfactory efficiency of the production of mechanical energy.

One particular refinement of the invention provides that a cold accumulator can be connected into the first line downstream of the second thermal fluid energy machine as viewed in the throughflow direction of the charging circuit. Here, it must be taken into consideration that the working gas exhibits temperatures far below the freezing point after it exits the second fluid energy machine. In this way, cold energy is provided which, according to the invention, is stored in the cold accumulator. Here, said cold energy can be used for example for the operation of a refrigerated warehouse, such that the energy expenditure otherwise incurred for the cooling of the refrigerated warehouse can be saved. This yields an overall improvement of the balance of the installation. Another possibility exists in that the cold accumulator may also be connected into the second line downstream of the third thermal fluid energy machine as viewed in the throughflow direction of the discharging circuit. This may—as already explained—be realized by a duct system, which is independent of the charging circuit, in the cold accumulator. The cold accumulator then serves for the condensation of the steam, and can in this case operate in a highly effective manner. In particular, the passage path for the steam/the liquid working medium can be shortened in relation to customary condensers because a higher temperature gradient is available. The associated lower flow resistance in the cold accumulator (which is used as a condenser) improves the overall efficiency of the installation.

For the thermal charging of the heat accumulator and of the cold accumulator, it is advantageous if the working gas flows through the auxiliary heat accumulator before flowing through the first fluid energy machine. That is to say that the working gas is fed into the first fluid energy machine having been heated by the auxiliary heat accumulator. The use of the auxiliary heat accumulator has the following advantages. If the installation is used for the storage of thermal energy, the flow passes through the auxiliary heat accumulator before passing through the first/third fluid energy machine that operates in this case as work machine (compressor). In this way, the working gas is already heated to a temperature higher than ambient temperature. This has the advantage that the working machine does not need to absorb as much power to achieve the demanded temperature of the working gas. Specifically, the heat accumulator should be heated to over 500° C., wherein, following the preheating of the working gas, this can advantageously be realized even by commercially available thermodynamic compressors which permit a compression of the working gas to 15 bar. It is therefore advantageously possible, for the structural units of the installation, to resort to components that are commercially available without expensive modifications. It is advantageously possible for the working gas to be heated to a temperature between 60° C. and 100° C., particularly advantageously to a temperature of 80° C., in the auxiliary heat accumulator. As already mentioned, the working gas can be compressed to 15 bar in the charging circuit of the heat accumulator and of the cold accumulator, whereby temperatures of the working gas of up to 550° C. can be achieved.

In one particularly advantageous refinement of the invention, it may also be provided that the auxiliary heat accumulator can also be connected into the second line upstream of the heat accumulator as viewed in the throughflow direction of the discharging circuit. It can be ensured in this way that the water or the steam is ready preheated in the auxiliary heat accumulator such that the heat that is stored in the relatively hot heat accumulator is available for superheating the steam for a longer period of time. Therefore, the installation can advantageously be operated for as long as possible with the demanded pressure and the demanded temperature for optimum efficiency.

It is particularly advantageous for a second closable bypass line to be connected into the second line in parallel with respect to the heat accumulator. In this way, in operating states in which the heat accumulator is not adequately charged, it is possible for the auxiliary heat accumulator to be used on its own. In this case, the temperature prevailing in the auxiliary heat accumulator is for operating the low-pressure turbine of a third fluid energy machine, which is of two-stage form, on its own and thereby outputting mechanical power with satisfactory efficiency.

Alternatively, the auxiliary heat accumulator may also be fed from external heat and cold sources. Here, use may expediently be made of district heat from a power plant, for example. It is however particular advantageous for the auxiliary heat accumulator to also be charged by a heat pumping process. For this purpose, it is advantageously possible for the auxiliary heat accumulator to be connected between a fifth thermal fluid energy machine and a sixth thermal fluid energy machine by an auxiliary line, wherein, as viewed in the throughflow direction of the working gas from the fifth thermal fluid energy machine to the sixth thermal fluid energy machine, the fifth thermal fluid energy machine is positioned as work machine and the six fluid energy machine is positioned as prime mover. A separate heat pump circuit (auxiliary circuit) is thus advantageously available for the charging of the auxiliary heat accumulator, wherein the fifth and sixth fluid energy machines can be optimized for the temperature is to be generated in the auxiliary heat accumulator. It is self-evidently also possible for the auxiliary heat accumulator to be charged by the first or by the third fluid energy machine if suitable connection by lines and/or bypass lines is permitted. It is always necessary here to weigh up the expenditure for components versus the increase in efficiency for the individual process. Economical considerations are of primary importance in said weighing-up process.

The working gas may optionally be conducted in a closed or an open charging circuit or auxiliary charging circuit. An open circuit always eases ambient air as working gas. Said ambient air is drawn in from the environment and is also discharged again into the environment at the end of the process, such that the environment closes the open circuit. A closed circuit also permits the use of a working gas other than ambient air. Said working gas is conducted in the closed circuit. Since an expansion into the environment with simultaneous adoption of ambient pressure and ambient temperature is omitted, it is necessary in the case of a closed circuit for the working gas to be conducted through a heat exchanger which permits a dissipation of heat from the working gas to the environment.

It may for example be provided that the charging circuit for the storage of the thermal energy in the cold accumulator and/or the heat accumulator is in the form of an open circuit, and the second thermal fluid energy machine that operates therein as prime mover is constructed from two stages, with a water separator for the working gas being provided between the stages. Here, allowance is made for the fact that air moisture is contained in the ambient air. An expansion of the working gas in a single stage can have the effect that, owing to the intense cooling of the working gas to −100° C., for example, the air moisture condenses and, in the process, damages the thermal fluid energy machine. In particular, turbine blades can be permanently damaged owing to icing. An expansion of the working gas in two stages however makes it possible for condensed water to be separated off, for example at 5° C., in a water separator downstream of the first stage, such that, upon further cooling of the working gas in the second turbine stage, said water has already been removed and ice formation can be prevented or at least reduced. The risk of damage to the second fluid energy machine is advantageously reduced in this way.

If a closed circuit is used, a heat exchanger must be installed into the circuit upstream of the first and third fluid energy machines, and upstream of an auxiliary heat accumulator if one is used, in order to heat the working gas to ambient temperature. The use of a water separator and of a two-stage fluid energy machine as prime mover can then be omitted. In this case, too, it is possible for dehumidified ambient air to be used as working gas, the humidification of which is prevented by the closed nature of the circuit. Other working gases may however also be used.

BRIEF DESCRIPTION OF THE DRAWINGS

Further details of the invention will be described below on the basis of the drawing. Identical or corresponding elements in the drawing are in this case denoted by the same reference signs in each case, and will be explained multiple times only where differences exist between the individual figures. In the drawing.

DETAILED DESCRIPTION OF INVENTION

Figure 1:
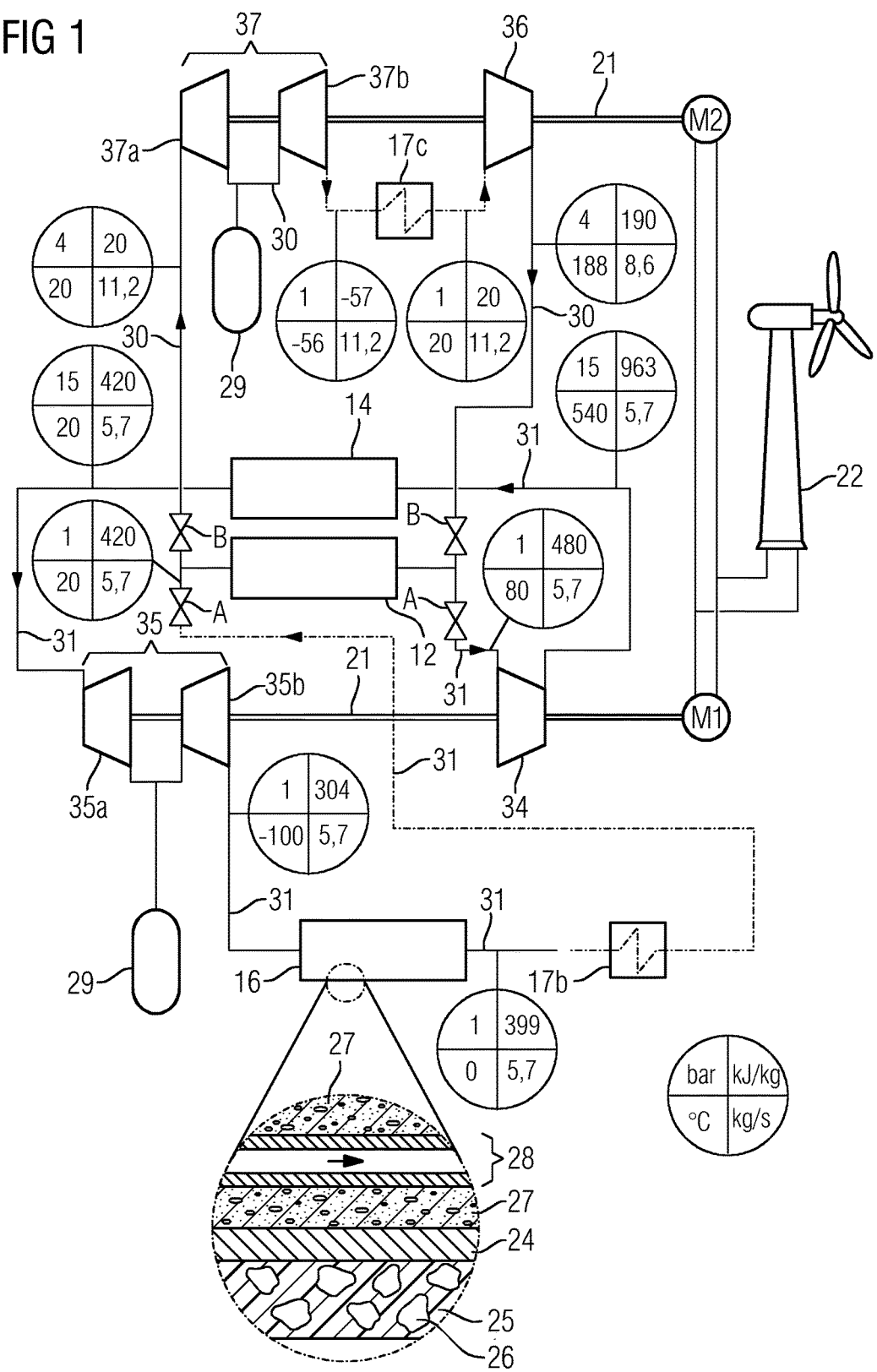
FIGS. 1 and 2 show, in each case in the form of block circuit diagrams, an exemplary embodiment of the installation according to the invention in the operating states of charging (FIG. 1) and discharging (FIG. 2)
Figure 2:
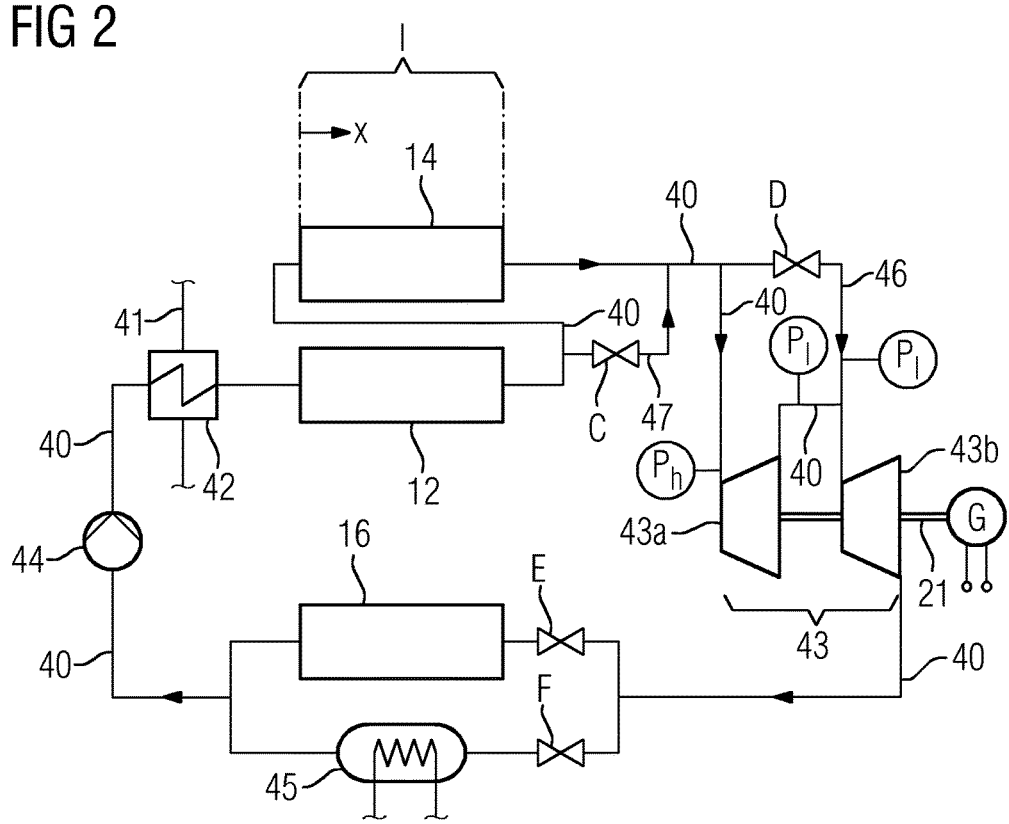
Figure 3:
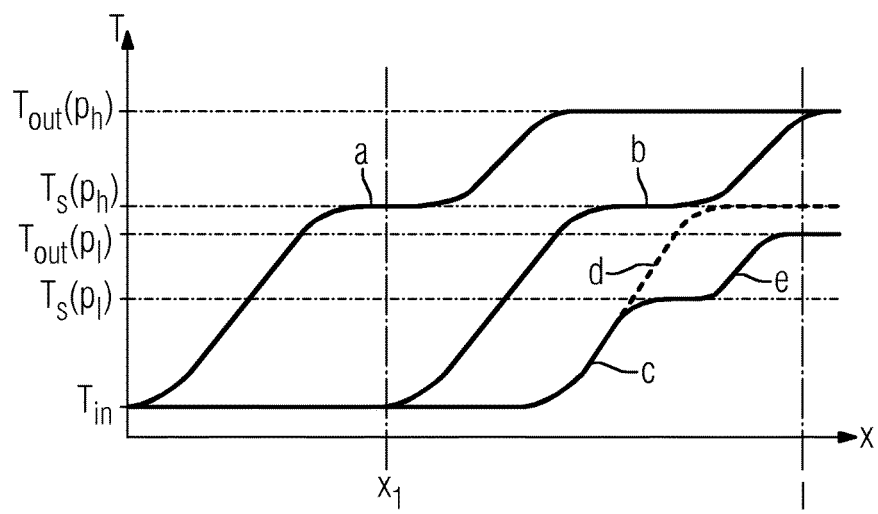
FIG. 3 shows, in the form of a graph, the temperature profile T of the steam in the heat accumulator 14 as a function of the distance x covered in the heat accumulator, and FIGS. 4 and 5 schematically show, in cross section, possible arrangements of pipes in the heat accumulator, auxiliary heat accumulator and cold accumulator.

The thermal charging and discharging process of thermal accumulators 12, 14, 16 will be explained in more detail on the basis of an installation as shown in FIGS. 1 and 2. FIG. 1 firstly illustrates a two-stage charging process which functions on the basis of the principle of a heat pump. The illustration shows an open charging circuit which could however be closed, as indicated by dash-dotted lines, through the use of an optionally provided heat exchanger 17b. The states of the working gas, which in the exemplary embodiment of FIGS. 2 and 3 is composed of air, are presented in each case in circles at the lines 30, 31. The pressure in bar is indicated at the top left. The enthalpy in kJ/kg is indicated at the top right. The temperature in ° C. is indicated at the bottom left, and the mass flow rate in kg/s is indicated at the bottom right. The flow direction of the gas is indicated by arrows in the respective line (said circles are also used in FIG. 2).

In the model calculation for the charging circuit of the first line 31 as per FIG. 1, the working gas passes at one bar and 20° C. into a (hitherto charged) auxiliary heat accumulator 12 and exits the latter at a temperature of 80° C. Compression by the first fluid energy machine 34, which operates as a compressor, results and a pressure increase to 15 bar and, as a result, also to a temperature increase to 540° C. Said calculation is based on the following formula:

$$T_2 = T_1 + (T_{2s} - T_1)/\eta_c;\ T_{2s} = T_1 \pi^{(K-1)/K}, \text{ where}$$

$T_2$ is the temperature at the compressor outlet,
$T_1$ is the temperature at the compressor inlet,
$\eta_c$ is the isentropic efficiency of the compressor,
$\pi$ is the pressure ratio (in this case 15:1), and
K is the compressibility, which is 1.4 in the case of air.

The isentropic efficiency $\eta_c$ may be assumed to be 0.85 for a compressor.

The heated working gas now passes through the heat accumulator 14, where the major part of the available thermal energy is stored. During the storage process, the working gas cools to 20° C., whereas the pressure is maintained at 15 bar. Subsequently, the working gas is expanded in two series-connected stages 35a, 35b of a second fluid energy machine 35, such that said working gas arrives at a pressure level of 1 bar. In the process, the working gas cools to 5° C. after the first stage and to −100° C. after the second stage. The formula specified above serves as a basis for this calculation too.

In the part of the line 31 that connects the two stages 35a, 35b of the second fluid energy machine 35, in the form of a high-pressure turbine and a low-pressure turbine, there is additionally provided a water separator 29. Said water separator makes it possible for the air to be dried after a first expansion, such that the air moisture contained in said air does not lead to icing of the turbine blades in the second stage 35b of the second fluid energy machine 35.

In the further course of the process, the expanded and thus cooled working gas extracts heat from the cold accumulator 16 and is thereby heated to 0° C. In this way, cold energy is stored in the cold store 16, which cold energy can be utilized for subsequent energy production. Comparing the temperature of the working gas at the outlet of the cold accumulator 16 and at the inlet of the auxiliary heat accumulator 12, it is clear why the heat exchanger 17b must be provided in the case of a closed charging circuit. Here, the working gas can be heated to ambient temperature of 20° C. again, whereby heat is extracted from the environment, said heat being provided to the process. Such a measure may self-evidently be omitted if the working gas is drawn indirectly from the environment, because said working gas is then already at ambient temperature.

In order that preheating can be realized by the auxiliary heat accumulator 12 in the cycle of the charging circuit of the first line 31, an auxiliary circuit is realized by an auxiliary line 30, in which auxiliary circuit the auxiliary heat accumulator 12 can be charged. It must therefore be possible for the auxiliary heat accumulator 12 to be connected both to the charging circuit of the first line 31 and also to be auxiliary charging circuit of the auxiliary line 30. A connection to the first line 31 is realized by the valves A, whereas a connection to the auxiliary line 30 is ensured by opening the valves B. In the cycle of the auxiliary line 30, the air is initially conducted through a fifth fluid energy machine 36, which operates as a compressor. The compressed air is conducted through the auxiliary heat exchanger 12, wherein the throughflow direction is, corresponding to the indicated arrows, the exact opposite of that in the charging circuit formed by the first line 31. After the air has been raised from ambient pressure (1 bar) and ambient temperature (20° C.) to 4 bar and a temperature of 188° C. by the compressor, the air is cooled again to 20° C. by the auxiliary heat accumulator 12. The air is subsequently expanded in two stages by the stages 37a, 37b of a sixth fluid energy machine 37, which operates as a turbine. Here, too, a water separator 29 is provided in the auxiliary line 30 that connects the two stages 37a, 37b, which water separator functions in exactly the same way as that is situated in the first line 31. After expansion of the air by the sixth fluid energy machine 37, said air is at a temperature of −56° C. at ambient pressure (1 bar). If the auxiliary circuit of the auxiliary line 30 is closed design, as illustrated by the dashed-dotted line, it is therefore necessary for a heat exchanger 17c to be provided in order that the air can be heated from −56° C. to 20° C. by release of heat to the environment.

The circuits of the first line 31 and of the auxiliary line 30 are set in operation independently of one another. The first and second fluid energy machines are thus mechanically coupled via one shaft 21 to a motor M1, and the fifth and sixth fluid energy machines are mechanically coupled via the other shaft 21 to a motor M2. In the event of overcapacities of the wind turbine 22, the electrical energy can initially drive the motor M2 in order to charge the auxiliary heat accumulator 12. Subsequently, by operation of the motor M1 and simultaneous discharging of the auxiliary heat accumulator 12, the heat accumulator 14 and the cold accumulator 16 can be charged. Subsequently, by operation of the motor M2, the auxiliary heat exchanger 12 can be recharged. When all the accumulators are fully charged, and effective discharging cycle for the production of electrical energy can be initiated (cf. FIG. 2). However, if the overcapacity of the wind turbine 22 comes to an end without it having been possible for the auxiliary heat accumulator 12 to be charged, the energy provided therein can also be replaced by some other heat source 41, or only the heat accumulator 14 is used (cf. FIG. 2).

Also conceivable is an auxiliary heat accumulator 12 which can be fed through separate line systems for the first line 31 and the auxiliary line 30. This would yield two independent circuits without the use of valves A and B. In this way, it would be possible for the auxiliary heat accumulator 12 to be charged and discharged simultaneously. Simultaneous operation of the motors M1, M2 is therefore also conceivable in this case. This operating regime has two advantages. Firstly, even relatively large overcapacities of the wind turbine 22 can be captured through simultaneous operation of the motors M1, M2, resulting in greater flexibility of the system. Furthermore, through simultaneous operation of both motors, it would be possible to ensure that the three thermal accumulators 12, 14, 16 are always charged simultaneously and not in succession. The charging process can thus be stopped at any time, with full operational capability of the discharging process, when there are no longer overcapacities in the electrical grid and, instead, there is a demand for additional electrical energy.

In FIG. 2, the installation is now operated with a discharging circuit which is realized by a second line 40. The line 40 constitutes a closed circuit. Water is evaporated and superheated by the auxiliary heat accumulator 12, the heat accumulator 14 and optionally by a further heat source 41, for example district heat, via a heat exchanger 42, and thus passes via the line 40 (valves C and D are closed) to a third thermal fluid energy machine 43. The latter is of two-stage construction, composed of a high-pressure turbine 43a and a low-pressure turbine 43b which are traversed by flow in succession. The fluid energy machine 43 drives a generator G via a further shaft 21. Thus, when required, said generator generates electricity as the thermal accumulators 12, 14, 16 are discharged.

The steam exits the low-pressure turbine 43b and is conducted via the line 40 through the open valve E and through the cold accumulator 16, which is thereby discharged. In the process, the steam condenses and is supplied through the line 40 of a pump 44 (fourth fluid energy machine) back to the heat accumulators, whereby the circuit is closed. When the cold accumulator 16 is empty, a heat exchanger is alternatively available as a condenser 45. The latter may operate on the basis of the generally customary operating principles. To activate the condenser 45, the valve E is closed and the valve F is opened.

Through actuation of the valves C and D, it is possible in certain operating states for the efficiency of the installation to be improved. The valve D is situated in a first bypass line 46 in which, when the valve D is opened, the high-pressure turbine 43a can be bypassed. Said operating state is expedient if the temperature in the heat accumulator 14 is no longer sufficient to raise the pressure in the line 40 to the required level through superheating of the water vapor. Such a situation may arise as a result of a partial discharge, or incomplete charging, of the heat accumulator 14 (this will be discussed in more detail below, see FIG. 3).

In the most extreme case, the heat accumulator 14 is emptied completely, while the auxiliary heat accumulator 12 has already been charged. Said state may arise for example if the wind turbine 22 has only been able to provide additional energy for a short time but now an excess demand for electrical energy has to be covered. In this case, in addition to the valve D, the valve C of a second bypass line 47 may also be switched. In this case, the heat accumulator 14 is bypassed by the bypass line 47, such that the auxiliary heat accumulator 12 can be emptied via the low-pressure turbine 43b. Thus, thermal energy is already available in the installation, which thermal energy can be converted into electrical energy with satisfactory efficiency by the generator G. In this case, the cold accumulator 16 is also not yet charged, because the latter is charged together with the heat accumulator 14. For said operating state, the condenser 45 is thus activated by the valve F.

To allow FIG. 3 to be better understood, some physical variables are plotted in FIG. 2. The high-pressure turbine is fed with steam at a pressure $p_h$. For the feed to the low-pressure turbine 43b, steam at a relatively low pressure of $p_l$ is sufficient. Said pressure exists in the connecting line 40 between the high-pressure turbine 43a and the low-pressure turbine 43b, or in certain operating states, after the opening of the valve D, also in the bypass line 46. Furthermore, the heat accumulator 14 has a length l that must be traversed lengthwise, along a path variable x, by the steam to be heated.

In FIG. 3, said path variable x is plotted on the x axis. The temperature range when the traversing of the heat accumulator 14 is plotted versus the length l of the latter, such that the y axis indicates the temperature of the steam T. The figure shows firstly the temperature $t_{in}$ at which the water enters the heat accumulator. For the operation of the high-pressure turbine 43a, the temperature $t_{out}(p_h)$ is demanded, said temperature being sufficient for generating the demanded steam parameters. $T_s(p_h)$ indicates the temperature at which the water boils and evaporates, wherein said temperature is held until the water is fully evaporated. This is indicated by a horizontal part of the curve a. When all of the water has evaporated, superheating of the generated steam occurs owing to the relatively high temperature in the heat accumulator 14, whereby the demanded steam parameters are attained in the line 40. It can be seen from the curve a that, in the case of a fully charged heat accumulator, said demanded temperature is reached already after approximately ⅔ of the length l and no further superheating of the steam is possible thereafter, such that said temperature remains constant.

The curve b shows the state achieved when the cold-hot front in the heat accumulator 14 has already travelled as far as $x_1$ (this takes place with progressive discharging of the heat accumulator 14). In this case, the water remains at the temperature $T_{in}$ as far as $x_1$, wherein the remaining travel $1-x_1$ is sufficient to achieve exactly the demanded temperature $T_{out}(p_h)$.

If the high-pressure turbine 43a were now to be fed with further steam, said steam would duly still evaporate in accordance with the curve c and the dotted-line curve d, but would no longer be able to be superheated because the steam would not be able to be heated any further before the end x=1 of the heat accumulator 14 is reached. By virtue of the valve D being opened, and thus by virtue of the high-pressure turbine 43a being bypassed, the steam is however now fed directly into the low-pressure turbine 43b. As a result, the pressure in the bypass line 46 falls, and the required temperature $t_{out}(p_l)$ likewise falls. Thus, the temperature profile now follows the path of curves c and e, that is to say the water is evaporated already at $T_s(p_l)$ and the required temperature $t_{out}(p_l)$ is achieved in good time within the heat accumulator 14.

In the installation in FIGS. 1 and 2, the heat accumulator 14 and the cold accumulator 16 and the auxiliary heat accumulator are in each case of identical construction, said construction being illustrated in more detail in FIG. 1 by way of an enlarged detail based on the cold accumulator 16. A tank is provided, the wall 24 of which is provided with an insulation material 25 which has large pores 26. In the interior of the container there is provided concrete 27 which functions as a heat accumulator or cold accumulator. Pipes 28 are laid, so as to run parallel, within the concrete 27, through which pipes the working gas flows, releasing heat or absorbing heat in the process (depending on the operating mode and accumulator type).

Figure 4:
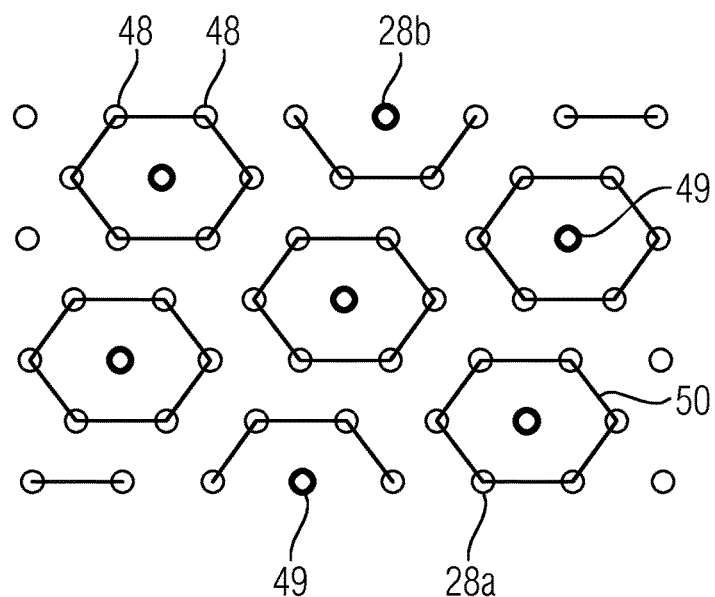
Figure 5:
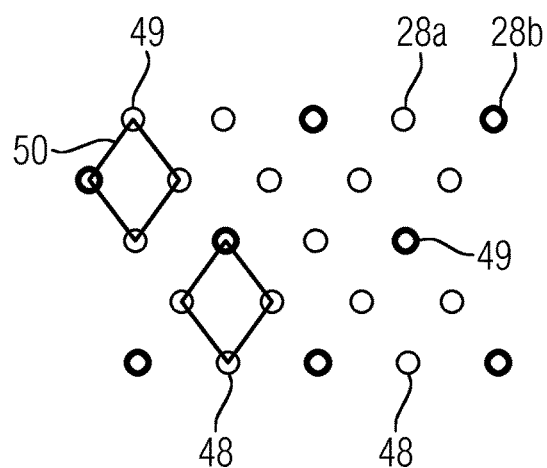

FIGS. 4 and 5 each show a detail of a cross section through the heat accumulator 14, the cold accumulator 16 and the auxiliary heat accumulator 12, wherein the pipes 28 can be seen in the cross section. The figures show thin-walled pipes 28a and thick-walled pipes 28b. The thin-walled pipes 28a form a first duct system 48 and the thick-walled pipes 28b form a second duct system 49. For clarity, the heat storage medium 27 is not illustrated. Furthermore, guide lines 50 are plotted, wherein said guide lines do not constitute a real structure of the corresponding accumulator that serve merely for illustrating the geometric arrangement.

The thin-walled pipes 28a which form the first duct system 48 are connected to the first line system 31 and to the auxiliary line system 30. Relatively low pressures prevail here, which explains the relatively thin walls of the pipes 28a. The second duct system 49, which is formed by the thick-walled pipes 28b, is connected to the second line system 40. Said pipes must withstand the relatively high steam pressure, for which reason they are of thick-walled design. It can be seen that there is a greater number of thin-walled pipes 28 than thick-walled pipes 28. As a result, the duct system 48 has a larger cross section than the duct system 49. As shown by the guide lines, it is the case in the arrangement of the pipes as per FIG. 4 that a ratio of thick-walled pipes 28b to thin-walled pipes 28a is 1:6 (in FIG. 4), or 1:5 (in FIG. 5). Nevertheless, from the elementary cells indicated by guide lines 50, it can be seen that each thin-walled pipe 28a has at least one thick-walled pipe 28b adjacent thereto. This yields a regular pattern of pipes, which leads altogether to homogenous heating of the heat accumulator.

The invention claimed is:
1. An installation for storing thermal energy, said installation comprising:
a charging circuit for a working gas, wherein, in the charging circuit, the following are connected to one another in the stated sequence by a first circuit for the working gas:
a first thermal fluid energy machine,
a heat accumulator comprising a length, and
a second thermal fluid energy machine,
wherein, as viewed in a throughflow direction of the working gas from the first thermal fluid energy machine to the second thermal fluid energy machine, the first thermal fluid energy machine is a work machine and the second thermal fluid energy machine is a prime mover,
wherein the heat accumulator is connected, via a second circuit, into a discharging circuit for steam as working medium, wherein, in the discharging circuit, the following units are connected to one another in the stated sequence by the second circuit:
a pump,
the heat accumulator, and
a third thermal fluid energy machine as a prime mover,
wherein the working medium passes through the heat accumulator for the whole length of the heat accumulator; and
an auxiliary heat accumulator connected between a fifth thermal fluid energy machine and a sixth thermal fluid energy machine by an auxiliary circuit, wherein the auxiliary circuit from the fifth thermal fluid energy machine to the auxiliary heat accumulator and from the auxiliary heat accumulator to the sixth thermal fluid energy machine is discrete from the first circuit and the second circuit, and wherein the fifth thermal fluid energy machine is a work machine and the sixth thermal fluid energy machine is a prime mover.
2. The installation as claimed in claim 1, wherein the heat accumulator is traversed by flow in opposite directions in the charging circuit and in the discharging circuit.
3. The installation as claimed in claim 1, wherein the heat accumulator comprises a storage medium and a first duct system disposed in the storage medium and connected to the first circuit and has an independent second duct system disposed in the storage medium and connected to the second circuit.
4. The installation as claimed in claim 3, wherein the first duct system and the second duct system are formed by pipes running parallel, wherein each pipe belonging to the first duct system runs adjacent to at least one pipe of the second duct system.
5. The installation as claimed in claim 1, wherein the third thermal fluid energy machine is of at least two-stage construction with a high-pressure turbine and a low-pressure turbine.
6. The installation as claimed in claim 5, further comprising
a first closable bypass line connected in parallel with the high-pressure turbine in the second circuit.
7. The installation as claimed in claim 1, further comprising
a cold accumulator connected into the first circuit downstream of the second thermal fluid energy machine as viewed in the throughflow direction of the charging circuit.
8. The installation as claimed in claim 7, wherein the cold accumulator is also connected into the second circuit downstream of the third thermal fluid energy machine as viewed in the throughflow direction of the discharging circuit.
9. The installation as claimed in claim 1, wherein the auxiliary heat accumulator is also connected into the first circuit so that the first circuit is configured to guide the working gas from the auxiliary heat accumulator to upstream of the first thermal fluid energy machine then to the heat accumulator then to the second thermal fluid energy machine.
10. The installation as claimed in claim 1, wherein the auxiliary heat accumulator is also connected into the second circuit so that the second circuit is configured to guide the working medium from the auxiliary heat accumulator then to the heat accumulator then to the third thermal fluid energy machine.
11. The installation as claimed in claim 5, further comprising
a second closable bypass line connected into the second circuit in parallel with respect to the heat accumulator.
12. The installation as claimed in claim 1, wherein the third thermal fluid energy machine is a steam turbine.
13. An installation for storing thermal energy, said installation comprising:
a charging circuit that fluidically connects a first flow of working gas to a first work machine, a heat accumulator comprising a storage medium, and a second prime mover in the stated sequence, wherein the storage medium is in thermal communication with the first flow of working gas when the first flow of working gas passes through the storage medium;
a discharging circuit that fluidically connects a working medium to a pump, the heat accumulator, and a third prime mover in the stated sequence, wherein the storage medium is in thermal communication with the working medium when the working medium passes through the storage medium; and
an auxiliary charging circuit that fluidically connects an auxiliary flow of working gas to a fifth work machine, an auxiliary heat accumulator, and a sixth prime mover in the stated sequence, wherein the auxiliary flow of working gas is discrete from the first flow of working gas and from the working medium.

14. The installation as claimed in claim 13, wherein:
the auxiliary heat accumulator is connected into the charging circuit so that the charging circuit is configured to guide the first flow of working gas from the auxiliary heat accumulator to the first work machine then to the heat accumulator then to the second prime mover,
wherein the auxiliary heat accumulator comprises an auxiliary storage medium, and
wherein the auxiliary storage medium is in thermal communication with the auxiliary flow of working gas when the auxiliary flow of working gas passes through the auxiliary storage medium.

15. The installation as claimed in claim 13, wherein the charging circuit and the auxiliary charging circuit share a line through the auxiliary heat accumulator and are discrete from each other elsewhere.

16. The installation as claimed in claim 13, wherein the charging circuit and the auxiliary charging circuit are fully discrete from each other.

17. The installation as claimed in claim 13, wherein the storage medium comprises a solid material.

18. An installation for storing thermal energy, said installation comprising
a charging circuit for a working gas, wherein, in the charging circuit, the following are connected to one another in the stated sequence by a first circuit for the working gas:
a first thermal fluid energy machine,
a heat accumulator comprising a solid heat storage medium, a length from a first side to an opposite side of the solid heat storage medium, a first duct system comprising a first pipe oriented parallel to the length and connected to the first circuit, and a second duct system comprising a second pipe oriented parallel to the length, and
a second thermal fluid energy machine,
wherein, as viewed in a throughflow direction of the working gas from the first thermal fluid energy machine to the second thermal fluid energy machine, the first thermal fluid energy machine is a work machine and the second thermal fluid energy machine is a prime mover,
wherein the second duct system of the heat accumulator is connected, via a second circuit, into a discharging circuit for steam as working medium, wherein, in the discharging circuit, the following units are connected to one another in the stated sequence by the second circuit:
a pump,
the heat accumulator, and
a third thermal fluid energy machine as a prime mover,
wherein the working medium passes through the heat accumulator for the whole length of the heat accumulator, and
wherein the working gas flows through the first duct system in the solid heat storage medium in a first direction and the working medium flows through the second duct system in the solid heat storage medium in an opposite direction, effective to create homogenous heating in a cross-sectional area of the solid heat storage medium perpendicular to the length, and effective to create a cold-hot front which travels along the length in opposite directions during charging and discharging respectively.

* * * * *